April 11, 1967  G. SEULEN ET AL  3,313,016
METHOD OF PRODUCING A CRANKSHAFT
Filed July 23, 1965  2 Sheets-Sheet 1

Inventors
Gerhard Seulen
Friedrich Scheffler
Otto Gunoser
By Cushman, Darby & Cushman
Attorneys

United States Patent Office 3,313,016
Patented Apr. 11, 1967

3,313,016
METHOD OF PRODUCING A CRANKSHAFT
Gerhard Seulen and Friedrich Scheffler, Remscheid, and Otto Gunsser, Nurtingen, Germany, assignors to AEG-Elotherm G.m.b.H., Remscheid-Hasten, Germany, and Gebr. Heller Maschinenfabrik G.m.b.H., Nurtingen, Germany
Filed July 23, 1965, Ser. No. 474,385
Claims priority, application Germany, July 24, 1964, A 46,678
5 Claims. (Cl. 29—149.5)

The invention relates to a method of producing a crankshaft which has oil holes in its crankpins and/or main bearing surfaces.

A known method of producing crankshafts for spark ignition and compression ignition engines, compressors, pumps and the like consists in using a heat-treatable steel and in subjecting the wearing surfaces of the bearings to a surface hardening process. Surface hardening is performed by heating the surfaces with oxyacetylene burners or with an electro-inductor and by then quenching the same. So long as the crankshafts are considerably overdimensioned and surface hardening is merely performed for the purpose of preventing excessive wear, the crankshafts thus produced satisfy the requirements they are intended to fulfill. However, in view of the tendency to raise the power of engines without at the same time enlarging the crankshaft, the latter must also possess a high resistance to cyclic and torsional loads. These properties can be provided by making the crankshaft from alloyed steels containing additionals of chromium, nickel, molybdenum and/or vanadium, but they are then extremely expensive. It is therefore the aim to improve the resistance to cyclic and torsional loads of shafts made of unalloyed or low alloyed constructional steels in some other way. It has been found that in fact the resistance of such a steel to cyclic and torsional loads can be substantially improved by modifying the shape of the hardened zone, namely by also hardening the radii in the corners of the crankpins and main bearing surfaces of the shaft. Without increasing the dimensions of the shaft or changing the materials of which the shaft is normally made, it is thus possible to raise the power loading of such a shaft by between 80 and 100%, without any risk of fracture. The wearing properties of the shaft remain unaffected because the bearing surfaces still possess the usual hardened zone.

However, when main and big end bearings are hardened in this particular way, critical regions under high loads are the points where oil holes are located, because in these regions the hardened zone penetrates more deeply when heating is performed with oxyacetylene burners or electro-inductors.

Figure 1:
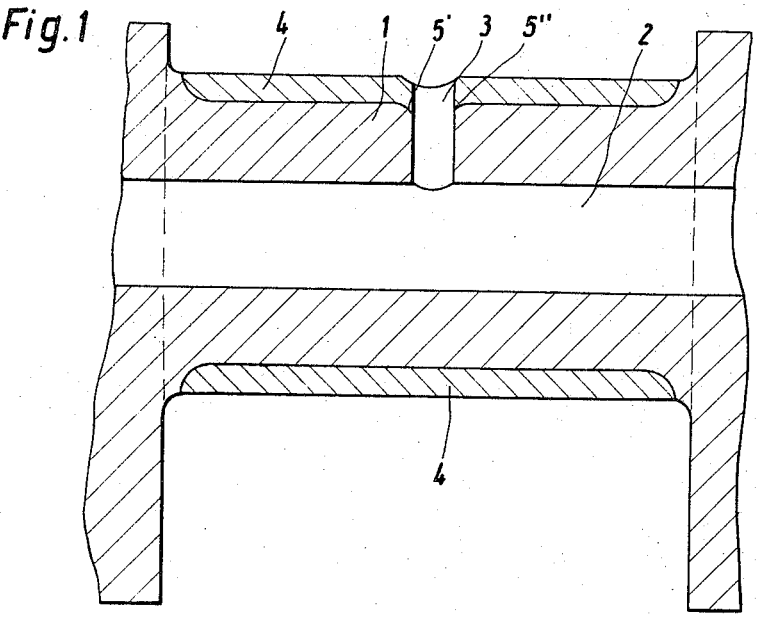
Figure 2:
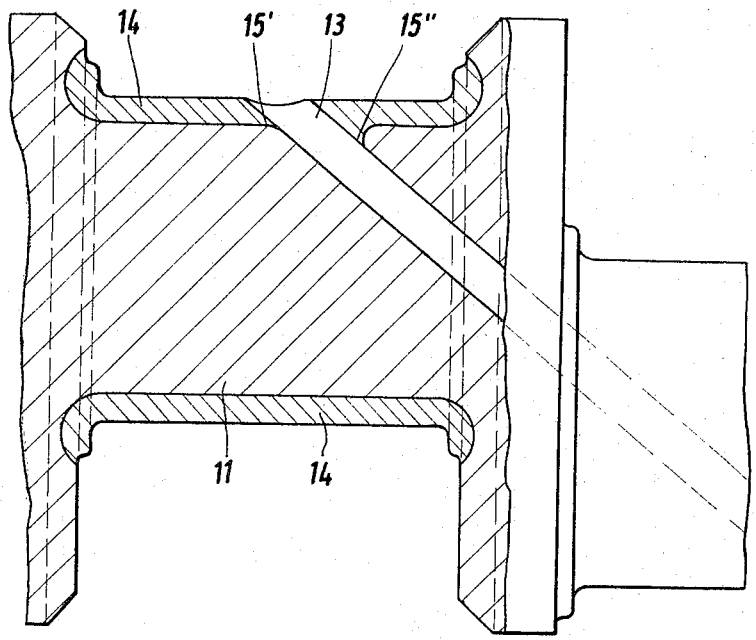

In vertical axial sections FIGS. 1 and 2 illustrate what occurs in these circumstances when normal straight or obliquely drilled oil holes are present.

FIG. 1 illustrates a main or big end bearing 1 provided with an axial bore 2. An oil channel 3 is provided which serves for the supply of oil to the bearing surface. With the aid of oxyacetylene burners or electro-inductors a hardened zone is produced which—as indicated at 4—extends parallel to the surface. However, in the region of the rounded edges at the outlet of the oil hole 3 the depth of penetration is greater, as shown at 5′ and 5″. This increase in hardening depth is due to the automatic build up of temperature at the edge of the oil hole. In inductive heating the crowding of the current filaments around the edges of the oil hole actually generates an increased heating effect in this region. It can hardly be avoided that, apart from the greater penetration of the hardened zone, the edge of the oil hole is also overheated to an undesirable extent and that in unfavourable circumstances this may be reflected in the generation in this region of a course grained structure.

Whereas in oil holes that are normal to the bearing surface (FIG. 1) the situation may not be too bad it becomes increasingly worse when the oil holes enter the surface at an angle, as shown in FIG. 2. The crankpin 11 shown in this drawing has an oil hole 13 which leads directly from the bearing surface through the web to the next bearing surface. In those parts of the bearing surface that contain no hole the hardened zone is parallel to the surface. However, in the neighbourhood of the oblique hole the depth of penetration is again increased, as indicated at 15′ on the obtuse angle side and at 15″ on the acute angle side. Particularly on the latter side the increase in depth of penetration rises to dangerous values. Because of the lack of sufficient solid material there is an accumulation of heat in this region accompanied by a particularly high overtemperature.

In practice it emerges that crankshafts that are thus hardened do not meet the conditions they are to fulfill. After having been in use for a shorter or longer period of time the material breaks away in the neighbourhood of such oil holes. Moreover, at greater depth in the oil holes themselves, particularly in the transitional region into the core, cracks appear after longer use and these may likewise cause the surface to break away. Naturally a crankshaft in which this occurs is destroyed because the bearings seize or run hot.

Tests have disclosed that shafts particularly affected by these troubles are shafts in highly loaded engines exposed to frequent temperature change. This temperature change enlarges and deepens the cracks that are formed and in some cases this leads to the complete destruction of the shafts.

In order to suppress the troubles that originate at the oil holes its is known during the hardening process to close the oil holes with metal plugs with a view to avoiding overheating. However, this step has not proved a success. According to another proposal that has not yet been published, the oil hole is filled with substances containing water of crystallisation that is released when a given temperature level is reached. Although this expedient reduces the generation of excessively high temperatures, it is still not sufficient.

The object of the present invention is the provision of a method which permits surface-hardened crankshafts to be produced that are free from the above described defects. The problem is solved by heating the peripheral region of the outlet opening of the oil hole to a depth that is less than that to which the remainder of the bearing surface is heated and, after having then deliberately provided a nonuniform surface-hardened layer by quenching, sinking the oil hole through the hardened layer by the electro-chemical removal of material.

Figure 3:
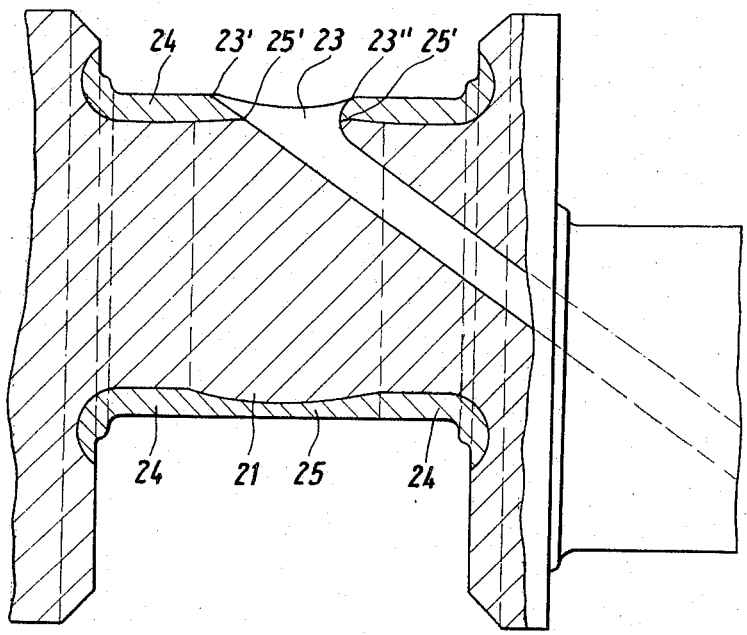

The proposed procedure leads to the formation of a hardened zone such as that represented in a vertical axial section in FIG. 3. It is proposed to provide this crankpin with an oblique oil hole 23. At the point where the oil hole penetrates the surface a hardened zone 25 is generated to a depth which is less than that in the zones 24 that are parallel to the surface. This deliberate non-uniform differential depth of the hardened zone can be readily achieved in a manner known to the art. For instance, if heating is effected by means of an electroinductor, the electrical coupling distance in region 25 is increased, or the inductor may be provided with magnetic yokes in the sections facing the regions 24, whereas no yokes are provided in the section facing region 25.

When using oxyacetylene burners it is likewise possible to reduce the supply of energy in the region where the oil hole is to be located. When the heated crankpin has been quenched the oil hole 23 is then sunk at least through the hardened zone at 25 by the electro-chemical removal of material.

The result of this procedure is that the depth of hardening at the rounded edges 23' and 23" of the oil hole 23, as indicated at 25' and 25", is at most equal to the depth of the hardened zone in the regions 24.

As known to the art, the electro-chemical removal of material is effected with a metal electrode with the aid of D.C. and an electrolyte consisting of an aqueous solution of a metal salt. The edges of the oil hole are conveniently rounded at the same time.

As such it would be possible to sink the entire hole 23 by electro-chemical erosion. However, the rate of material removal is rather slow and, according to another feature of the invention, it is therefore proposed to pierce only the hardened layer by electro-chemical action and then to complete the oil hole by machining. A particularly convenient way of performing these processes consists in clamping up the workpiece only once and in performing the electro-chemical process and then the drilling operation simply by replacing the toolholder.

Since drilling creates a burr it may be advisable to finish the hole by electro-chemical erosion, again using a correspondingly activable toolhead without the necessity of removing and relocating the work.

The greater penetration of the hardened layer in the region of the edges of the oil hole, which the procedure proposed by the invention avoids, and the simultaneous avoidance of overheating in this region, ensure that damage due to flaking and breaking away of the edges and so forth will not occur when the shaft is in use. This effect is assisted by the hardened layer being machined and the edges of the oil holes being rounded by electro-chemical erosion, because a completely smooth surface is thus produced. The absence of coring also assists in highly loaded shafts to prevent permanent fractures originating at the oil holes when the shaft is continuously subjected to cyclic and torsional loads.

What we claim is:

1. A method of producing an oil hole with an outlet opening into the peripheral surface of a crankpin portion or main bearing portion of a crankshaft, which comprises heating the peripheral layer of a said portion containing the said surface so that in the width region thereof which is to contain the said outlet the heating is to a depth not greater than that in the remaining width of said surface layer and quenching the thus heated portion to obtain a hardened layer, then forming the oil hole in the said region at least through the hardened layer by electro-chemical erosion of the material.

2. A method of producing an oil hole with an outlet in the peripheral surface of a crankpin portion or main bearing portion of a crankshaft, which comprises heating the peripheral layer of said portion containing the said surface so that in the width region thereof which is to contain the said outlet the heating is to a depth less than that in the remaining width of said layer and quenching the thus heated portion to obtain a deliberately non-uniformly hardened layer, then forming the oil hole in the said region at least through the hardened layer by electro-chemical erosion of the material.

3. The method claimed in claim 1, which comprises rounding the edges of the hole at the same time as the hole is electro-chemically sunk through the hardened layer.

4. The method claimed in claim 1, which comprises the step after the hole has been electro-chemically sunk through the hardened layer, of machining to increase the depth of the hole beyond the hardened layer.

5. The method according to claim 4, which comprises carrying out the said machining step to increase the depth of the hole beyond the hardened layer without removing and re-locating the work after the electro-chemical sinking of the hole in the hardened layer and after replacing the tool used therefor by the tool for the said machining step.

References Cited by the Examiner
UNITED STATES PATENTS

| | | | |
|---|---|---|---|
| 2,793,281 | 5/1957 | Steigerwald | 219—69 |
| 2,800,809 | 7/1957 | Pike | 29—149.5 XR |
| 3,148,446 | 9/1964 | Celovsky | 29—558 XR |
| 3,174,738 | 3/1965 | Seulen et al. | 29—559 |

JOHN F. CAMPBELL, *Primary Examiner.*

T. H. EAGER, *Examiner.*